E. BIGELOW, dec'd., L. P. BIGELOW, admr'x.,

J. MATTHEWS, assignee by mesne assignments.

Liquid Cooler for Cooling Liquids Under Pressure.

No. 9,272. Reissued June 29, 1880.

Witnesses:
Willy G. L. Schultz.
John C. Tunbridge.

assignee John Matthews
of E. Bigelow, deceased.
by his attorney
A. W. Briesen

N. PETERS, PHOTO-LITHOGRAPHER, WASHINGTON, D. C.

UNITED STATES PATENT OFFICE.

JOHN MATTHEWS, OF NEW YORK, N. Y., ASSIGNEE, BY MESNE ASSIGNMENTS, OF LUCY P. BIGELOW, ADMINISTRATRIX OF EDMUND BIGELOW, DECEASED.

LIQUID-COOLER FOR COOLING LIQUIDS UNDER PRESSURE.

SPECIFICATION forming part of Reissued Letters Patent No. 9,272, dated June 29, 1880.

Original No. 108,318, dated October 18, 1870. Application for reissue filed December 19, 1879.

DIVISION A.

*To all whom it may concern:*

Be it known that EDMUND BIGELOW, deceased, formerly of Springfield, in the county of Hampden and State of Massachusetts, did invent a new and useful Improvement in Liquid-Coolers for Cooling Liquids under Pressure, of which the following is a specification.

The nature of this invention consists in so constructing and arranging chambers in a cooler that the liquid to be cooled is brought in contact with the artificially-cooled outer and inner walls of the chambers in thin sheets, and is kept in contact with said walls for such part of the time occupied in its passage from the inlet to the outlet of the cooler as to reduce the liquid to a very low temperature with great rapidity.

That others may understand the invention, it is described as follows:

The best shape for the cooler is a cylinder or a series of cylinders connected together, but it is not intended to be confined to that precise form, though in this description it is described only as a cylinder or cylinders.

A metallic cylinder of suitable strength is constructed to resist the pressure of liquids charged with carbonic-acid gas, whether fermented liquids or liquids artificially aerated, and of suitable length and size for the ice-chest in which it is to be kept. In its exterior this cylinder presents no peculiar features. Within it is another cylinder of metal, and of suitable strength, so much less in size than the shell that when it is in place there is a space between its outer surface and the inner surface of the shell of one thirty-second part of an inch (more or less) in depth. The supply-port is so arranged that the liquid to be cooled is let into the apparatus between the shell and the inner cylinder, and is immediately spread out into a sheet only one thirty-second part of an inch in thickness, more or less, and separated from the ice in which the cooler when in use is packed by only the thickness of the shell. Longitudinal ribs are between the cylinders. The ends of the inner cylinder are, or may be, open. The liquid carried through a cooler of this construction is rapidly cooled.

Figure 2:
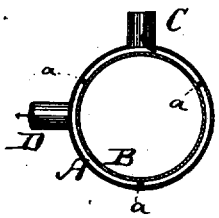
Figure 1:
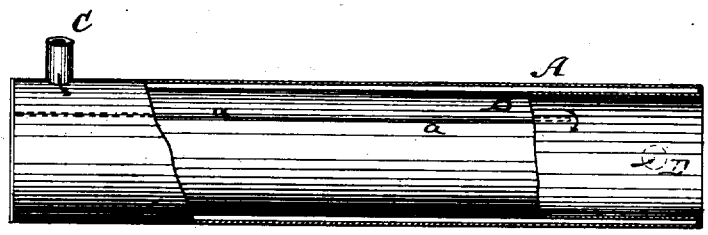
Figure 3:
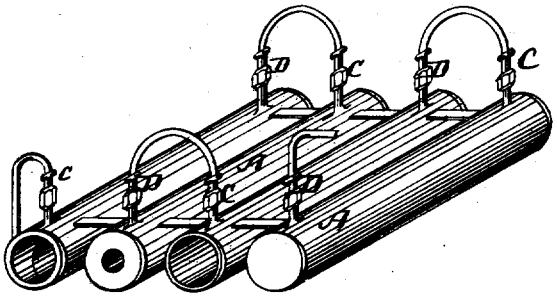

Figure 1 is a side view, partly in longitudinal section, of the improved cooler. Fig. 2 is a cross-section of same. Fig. 3 is a perspective view of a series of coolers united together.

A is the outer shell; B, the inner cylinder; C, the inlet-pipe; D, the outlet-pipe.

A series of ribs or threads, *a*, running longitudinally—*i e.*, in the direction of its length—along the inner surface of the shell A, or the outer surface of the inner cylinder, divides the space between the two cylinders into two, three, or more longitudinal channels. These threads or ribs are not quite as long as the outer cylinder, so that the liquid can travel back and forth one or more times before reaching the discharge-port. The inlet and outlet pipes communicate with the space between the two cylinders. The ends of the cylinder A are closed.

The ends of the cylinder B may be open, so that there be a hollow space within the inner cylinder, open to the direct action of the ice or ice-water, as the case may be, when the cooler is embedded in ice for use.

It will be seen by reference to the arrows that the liquid to be cooled enters the space between the cylinders A and B at the inlet-pipe C. Thence it travels to one end of the cooler, thence to the opposite end, and thence to the outlet-pipe D.

For the purpose of cooling soda-water on draft the cooler is most advantageously made with a series of cooling-cylinders connected together by suitable tubes, and of the proper length and size to be placed in the ice-compartment of the soda apparatus, as shown at Fig. 3.

I claim—

1. A cooler composed of an outer cylinder, A, an inner cylinder, B, intermediate longitudinal threads or ribs *a*, and an inlet and outlet pipe, substantially as herein shown and described.

2. A cooler composed of an outer cylinder, A, an inner cylinder, B, intermediate longitudinal threads or ribs *a*, inlet and outlet pipes C D, the ends of the cylinder B being open, substantially as herein shown and described.

JOHN MATTHEWS.

Witnesses.

DAVID WHITE,

JOHN STEVENS.